United States Patent

Huang

[11] Patent Number: 5,933,672
[45] Date of Patent: Aug. 3, 1999

[54] LOCKING MECHANISM FOR A FILM COMPARTMENT DOOR

[75] Inventor: Yeon-Fu Huang, Taichung, Taiwan

[73] Assignee: Sinpo Optical Co., Ltd., Taiwan, Rep. of Korea

[21] Appl. No.: 09/032,787

[22] Filed: Mar. 2, 1998

[51] Int. Cl.⁶ .................................................. G03B 17/02
[52] U.S. Cl. ............................................................. 396/536
[58] Field of Search .................................... 396/439, 535, 396/536, 538, 542, 387, 395, 396, 411, 413, 418

[56] References Cited

U.S. PATENT DOCUMENTS

| | | | |
|---|---|---|---|
| 4,887,114 | 12/1989 | Yamamoto et al. | 396/536 |
| 5,678,110 | 10/1997 | Koiwai | 396/535 |
| 5,697,007 | 12/1997 | Nishimura | 396/535 |
| 5,708,856 | 1/1998 | Cloutier | 396/6 |
| 5,752,120 | 5/1998 | Tanaka | 396/536 |
| 5,870,644 | 2/1999 | Naka et al. | 396/536 X |

*Primary Examiner*—Safet Metjahic
*Assistant Examiner*—J. K. Han

*Attorney, Agent, or Firm*—Dougherty & Troxell

[57] ABSTRACT

Advancing system of film compartment for cameras includes a film compartment lever on compartment cover between film shaft and gear, then on one side of the gear is equipped with a transmission gear, and a friction spring is equipped below that gear to contain an engaging block. Thus, as the engaging block follows the gear and the transmission gear to rotate, the engaging block can stop at two corresponding stops and immobilize the lever despite whether the film is in a loaded photo-ready or retracted position, to ensure and avoid the film compartment cover from opening. Furthermore, a transmission cover plate is equipped atop the gear, while the top side of the cover plate is equipped with positioning brass piece that engage with the circuit control board located at the very top side to facilitate the contact of the positioning brass piece and the brass soldering on the circuit control board. Then the positioning function of the gear reactivates the motor after the film has been retracted to shift the gear to rotate an appropriate loading distance so that the engaging block is shifted out of the stop position, while the lever can be maneuvered to open the film compartment cover and facilitate removing or loading a film.

7 Claims, 4 Drawing Sheets

LOCKING MECHANISM FOR A FILM COMPARTMENT DOOR

BACKGROUND OF THE INVENTION

The present invention relates generally to an advancing system of a camera film compartment, and more particularly to the process for loading and unloading films where the locking structure for the film compartment cover cannot be opened accidentally, to provide adequate protection to films that have already been shot.

Generally, all camera film rolls contain a certain fixed number of films, thus when a user uses it to take photographs but has not used up the entire roll, the user will try not to open the film compartment cover to avoid exposing the films that have been shot, which may cause irreversible regret.

As for the so-called advancing system, that will automatically open the film roll and mount the film to the shooting position when the film is loaded and the film compartment cover is closed to offer operating convenience. In the mean time, after the film is loaded, an engaging motion is used to detect the advancing mode in order to determine whether to activate the locking mechanism to close the film compartment cover. And until the entire roll is shot, the camera will automatically retract all the films that have been shot, and then disengage the locking mechanism to facilitate the user in opening the film compartment cover, removing the film roll that has already been shot and reloading an unused film roll for picture taking.

Despite the aforementioned advancing system of camera locking mechanism offers certain convenience in design and application, but also contains a serious potential disadvantage, which takes place when the film is advanced in photo-taking ready position, the locking mechanism will also cease to provide the locking function. In other words, during the process when the film roll is showing the position, if the user accidentally touches the film compartment cover latch, the film compartment cover will also pop out and causing error to indicate the number of the film roll, re-exposing the portion of film that already been shot during reloading, or preventing the loaded blank film roll from reloading.

SUMMARY OF INVENTION

A primary object of the present invention is to utilize functions of a transmission gear and an engaging block. Hence, it does not matter whether the film is loaded and ready for picture taking or during the retracting process, the corresponding stops on the compartment lever immobilize and ensure that the film compartment cover will not be opened by accident, thus further preventing the photographed films from re-exposure.

BRIEF DESCRIPTION OF THE DRAWINGS

The foregoing and other features and advantages of the present invention will be more clearly understood from the following detailed description and the accompanying drawing, in which.

DETAILED DESCRIPTION OF THE PREFERRED EMBODIMENT

Figure 1:
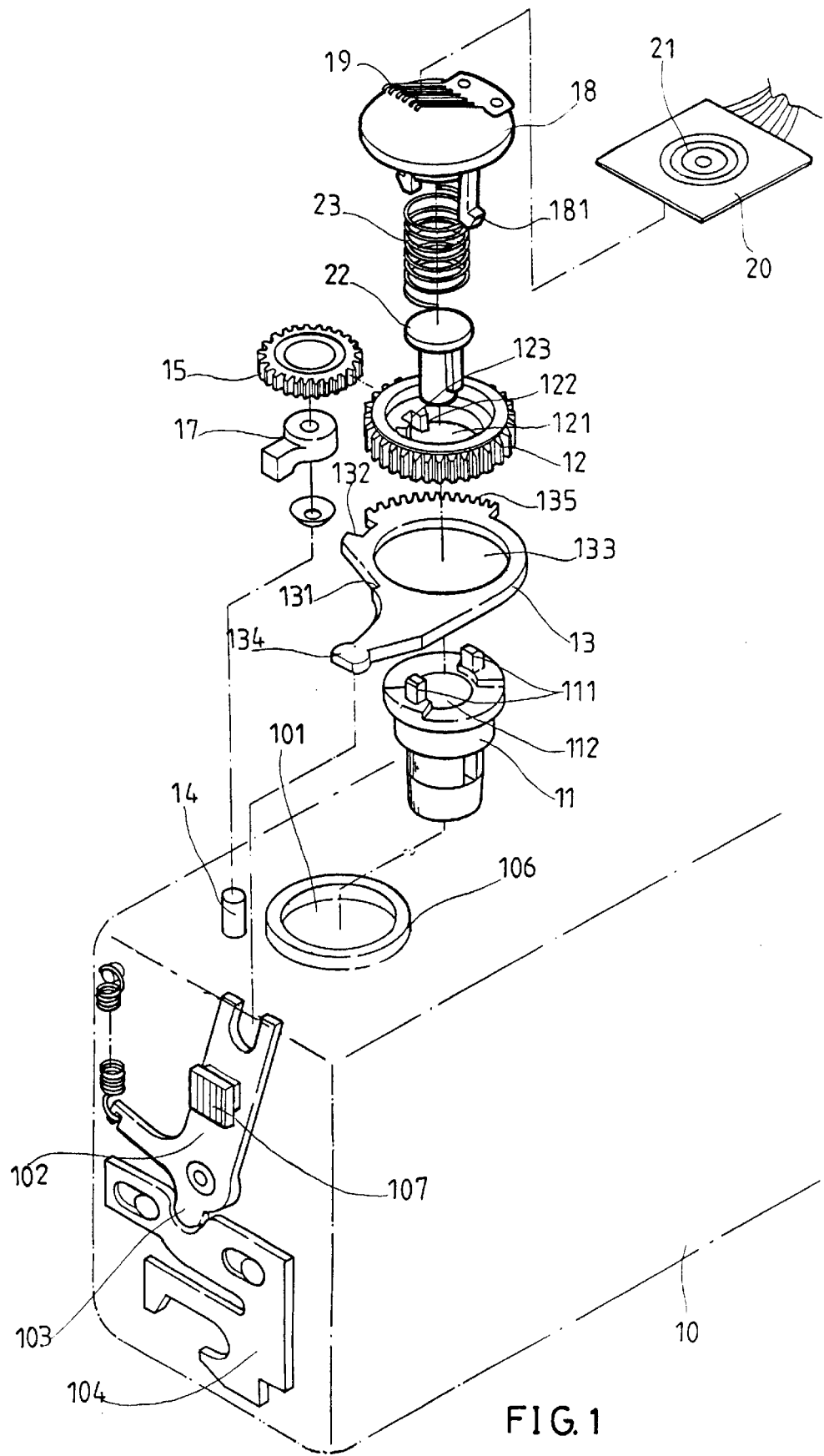
FIG. 1 is a perspective exploded view of a preferred embodiment of the present invention.
Figure 3:
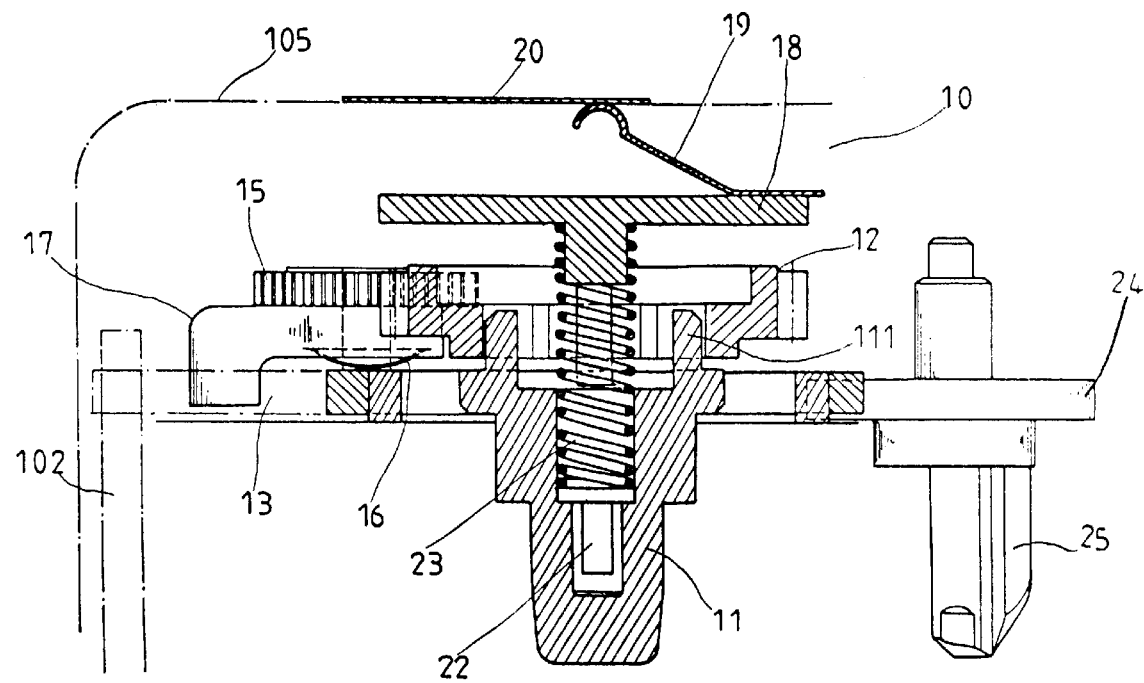
FIG. 3 is a front sectional view of a preferred embodiment of the present invention.
Figure 2:
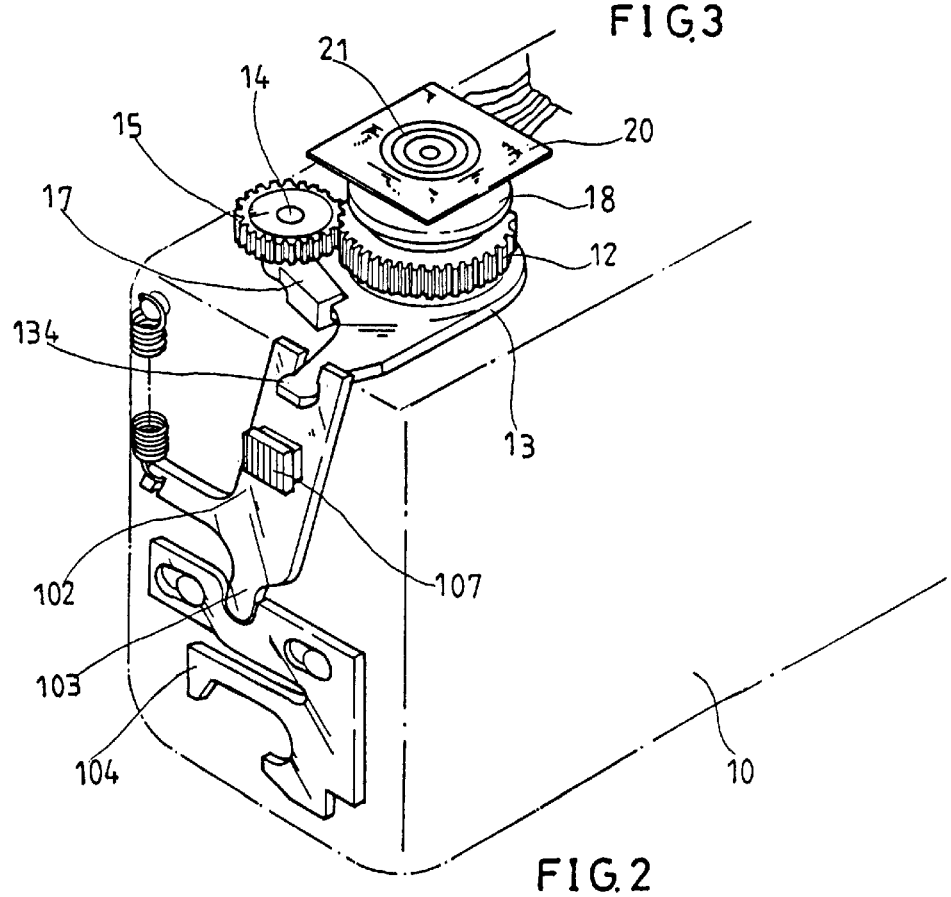
FIG. 2 is a perspective view of a preferred embodiment of the present invention.

Firstly, please refer to FIGS. 1, 2 and 3, which pertains to installing a compartment cover lever 13 between shaft 11 and gear 12 in a camera compartment 101 of camera 10; a transmission gear 15 is anchored on a post along one side of the gear 12, while a friction spring 16 is equipped below the transmission gear 15 to contain an engaging block 17: Thus, by utilizing the engaging block 17 that rotates with the gear 12 and the transmission gear 15, the engaging block 17 can stop two corresponding stops 131, 132 at the lever 13, and immobilize the lever 13 from any movement to ensure and prevent film compartment cover (not shown) from opening despite whether a film roll is loaded for picture taking or retracted. Furthermore, the space above the gear 12 is equipped with a transmission cover plate 18, and the space above the cover plate 18 is equipped with a positioning brass plate 19, which is used to engage with the circuit control board 20 located at the uppermost position to use the positioning brass plate 19 to engage with brass soldering 21 of the circuit control board 20 so that the gear positioning feature may once again activate the motor (not shown) to rotate the gear 12 in an appropriate distance after thefilm is loaded in place, so that the engaging block 17 is shifted out of the stop position, while the compartment cover lever 13 can be flipped to open the film compartment cover to facilitate removing or loading film.

The compartment cover lever 13 is connected through the coupling hole 133 to circular ring 106 on top of the film compartment 101 of the camera 10, and is not transmitted by the gear. Thus, when the gear 12 is transmitted by the motor as it carries the shaft to rotate for film loading or rewinding process, the position of the lever remains stationary. In addition, when the transmission plate 102 located on the side of the camera is touched, it relays on the lever 13, and then the pawl 103 on the other side of the transmission plate 102 presses against the reversed hook 104 on the compartment cover to nudge and open the film compartment cover.

The gear 12 is capped atop the shaft 11, and two vertical pawls 111 atop the shaft 11 are extended into inner holes 121 of the film gear 12 so that they engage with the circumferences of the two horizontal pawls 122 equipped in the inner holes 121 of the gear 12. In the mean time, in the inner hole 112 of the shaft 11 is sequentially inserted with a positioning pin 22 and a spring 23 so to provide a more solid transmission of the film. In addition, at the center of the two pawls equipped inside the two inner hole 121 of the gear 12 is each equipped with a groove 123 to facilitate two corresponding reversed hooks 181 at the bottom of the cover to engage in position.

The engaging block 17 is located between the transmission gear 15 and the friction spring 16, thus when the transmission gear 15 is moved by the film gear 12, that appropriate friction will make it rotate towards the free end. But when the engaging block 17 stops at any of the locking stops 131, 132 of the lever 13, the engaging block 17 also stops moving immediately. Until when the film sprocket 12 is moved backwards, the engaging block 17 will follow it to shift to a predetermined position.

Figure 4:
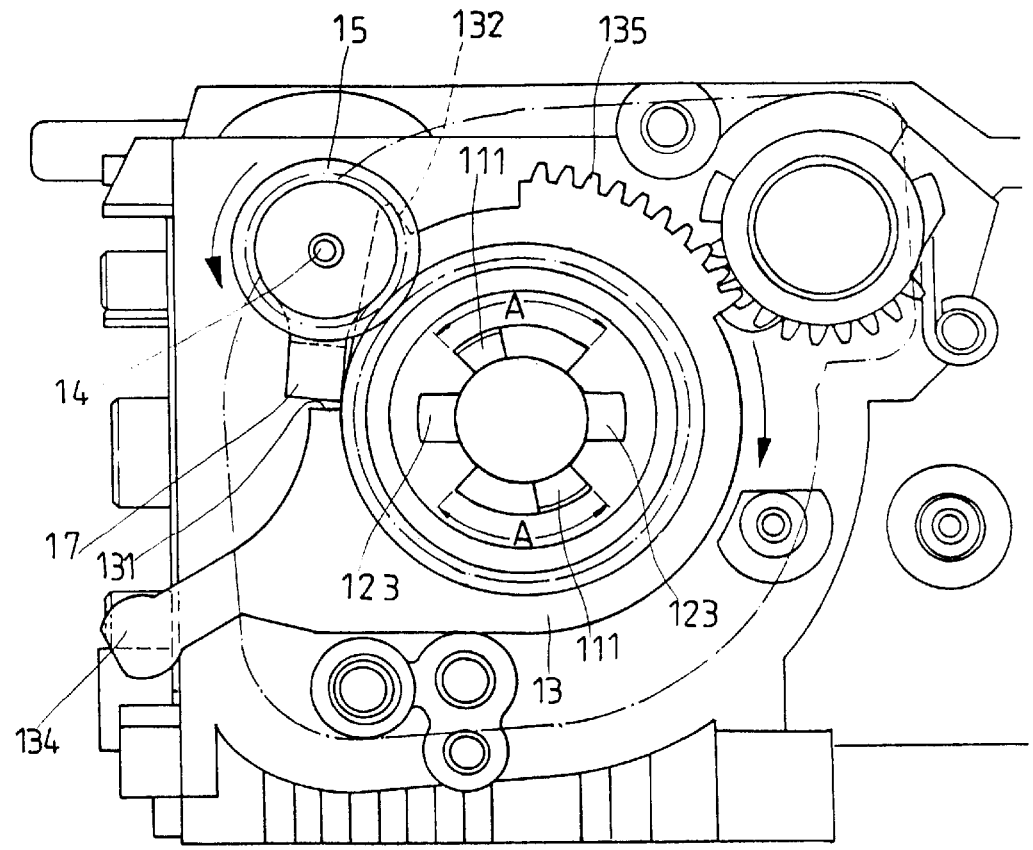
FIG. 4 is a schematic illustration of loading and photographing proposed by this invention.

Therefore, when the aforementioned structure is assembled, the locking mechanism will entirely be covered by the housing 105 of camera 10, and only the push button 107 of the transmission board 102 is exposed outside the camera housing. Therefore, referring to FIG. 4, when the film is loaded into the film compartment 101 of the camera and the film compartment cover is closed, the aforementioned camera motor will immediately rotate the film gear 12 in clockwise direction, and the cartridge gear 24 and its cartridge shaft 25, as transmitted by one end of that lever 13, will immediately open the window of the cartridge (not shown) and load and advance the film to enter a photo-ready mode. At the same time, it will then carry the transmission gear 15 to rotate in theopposite direction, and rotate the engaging block concurrently until it is stopped at the first locking part 131 of the lever 13 when that engaging block 17 does not move any further, and is maintained at a locking condition that stops the lever from being moved.

When the film gear 12 is rotating, the transmission cover plate 18 will follow it for simultaneous rotation, thus the positioning brass plate 19 atop the cover plate 18 and the corresponding brass soldering 21 can be used to check against the contact and detect the position of the gear 12.

Figure 5:
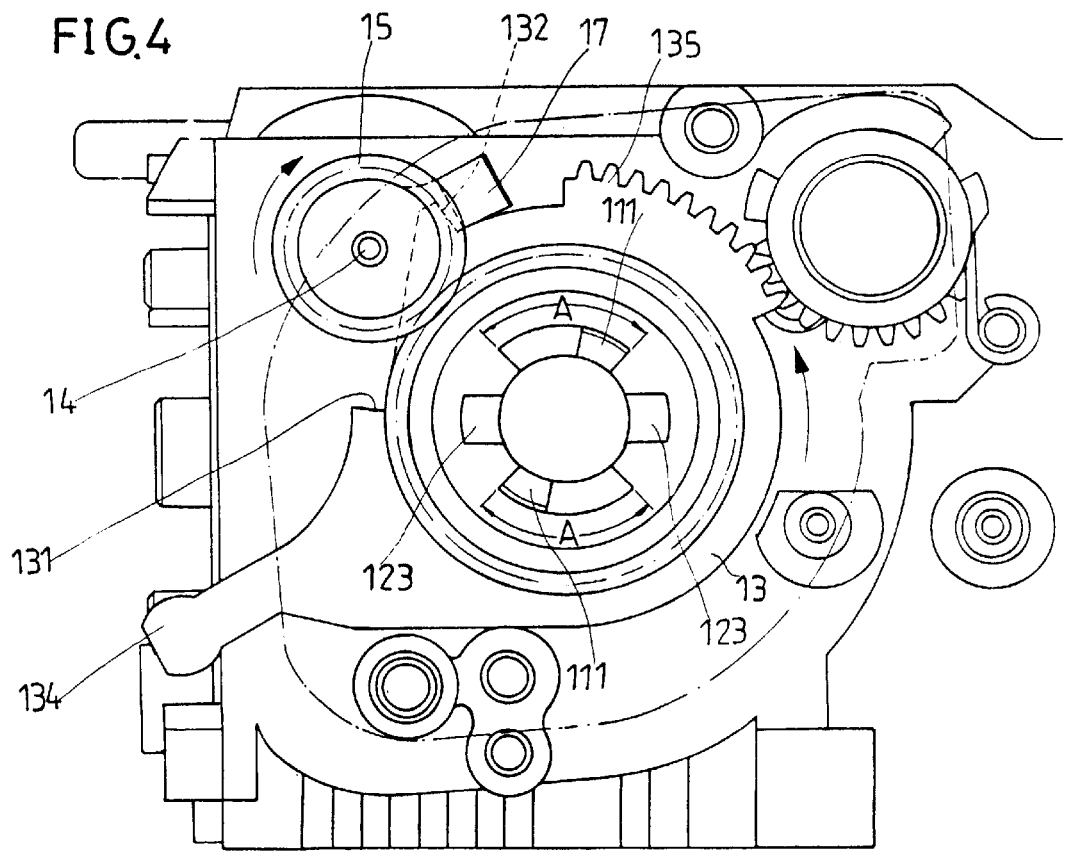
FIG. 5 is a schematic illustration of a retracted mode proposed in this invention.

Thereafter, as shown in FIG. 5, when the film is finished, the motor of camera 10 will automatically wind the film as it activates the gear 12 to rotate counter-clockwise. At this time, it also carries the transmission gear 15 to turn clockwise, and shifts the engaging block 17 in synchronized movement until it stops at the second stop 132 of the lever 13. The engaging block 17 will cease to move, and maintain the lever 13 in a locked condition that cannot be moved so to ensure and avoid the film compartment cover from opening during the winding process.

Figure 6:
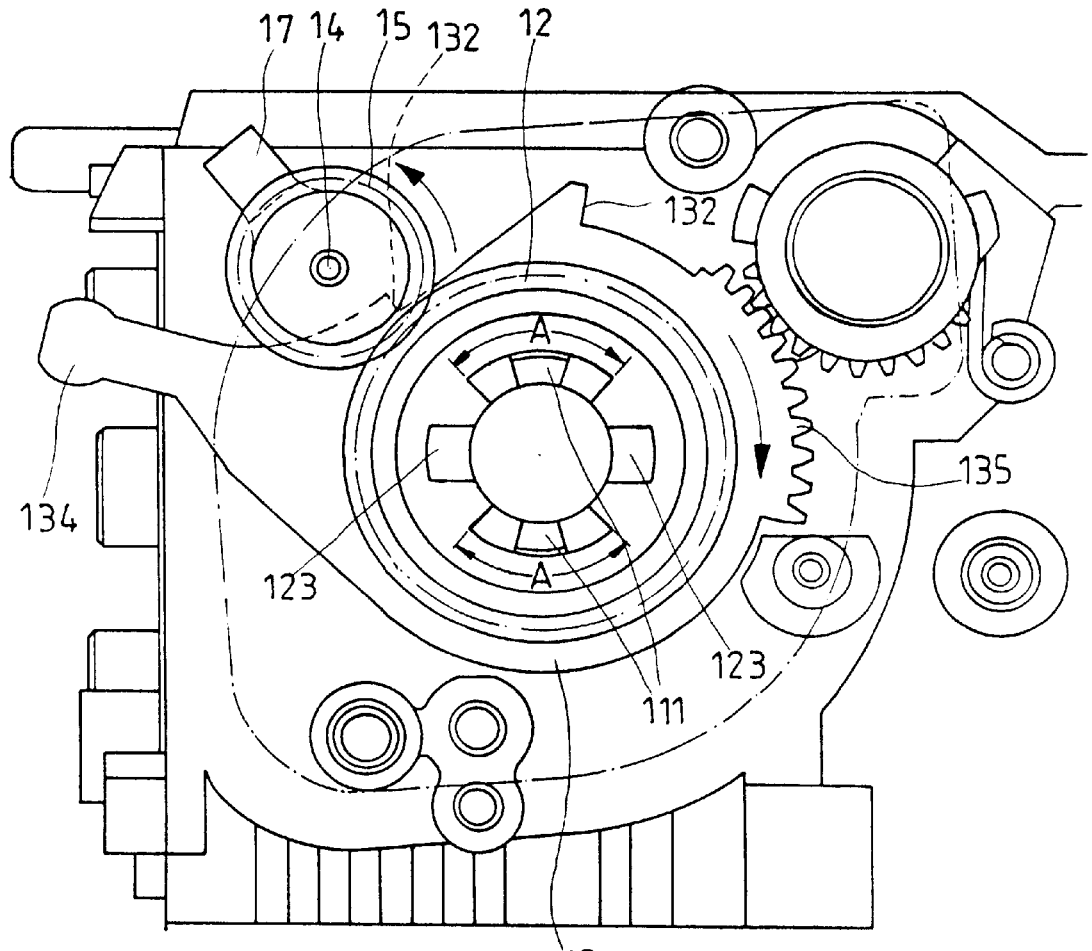
FIG. 6 is a schematic illustration of a disengaged locking mode proposed in this invention.

As shown in FIG. 6, when the film winding is completed, the positioning brass plate 19 atop the cover plate 18 and the brass soldering 21 on the circuit control board 20 can be used to detect the position of gear 12 as the motor is reactivated for movement to shift the gear 12 in loading position (clockwise direction) and stop right after rotating a short distance. At this time, the transmission gear 15 will carry the engaging block 17 from the second stop 132 at the lever 13 to shift to a predetermined canceling position as it cease to contact either stops 131 or 132 of the lever 13. Thus, that lever 13 can be shifted to facilitate opening the film compartment cover.

Figure 7:
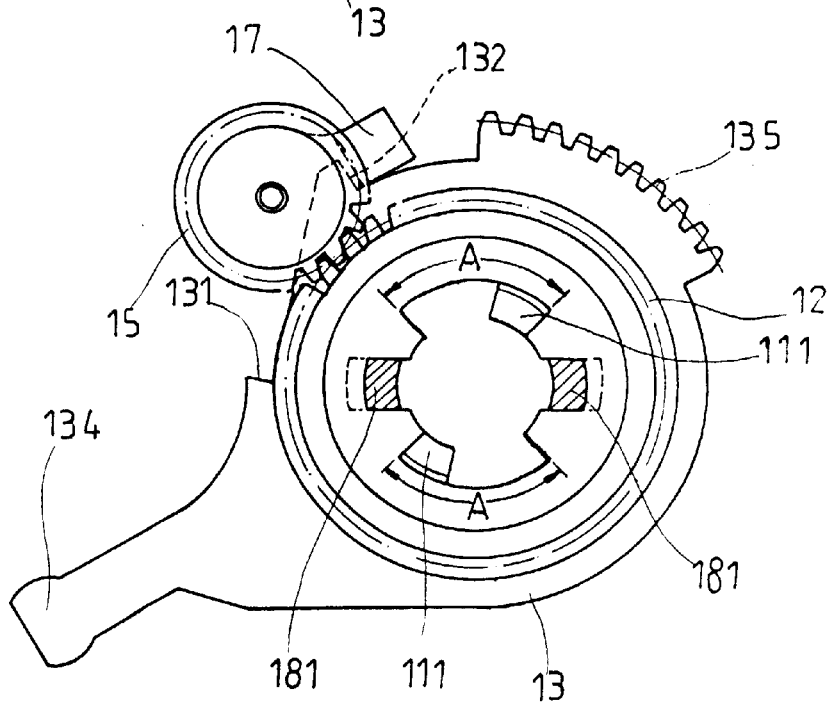
FIG. 7 is a schematic illustration of the shaft and the gear proposed in this invention.

In fact, although the film 11 relies on the two vertical pawls 111 at the top to engage the circumferences of the two horizontal pawls 122 equipped in the inner holes 121 of the gear 12, but the distance between these two pawls 122 is slightly larger than the width of the protruding posts 111 so that it is maintained with a free range angle A. So when the gear 12 is driven by the motor and turning from clockwise to counter-clockwise rotations (rewinding the film), or turning from counter-clockwise to clockwise rotation (loading the film), the gear 12 has to rotate a certain distance to make the pawls 122 in the inner holes 121 and engage the corresponding pawls 111 of the shaft 11, in order to generate transmission. When the shaft 11 completes the rewind movement, the positions of the pawls 111 are as the condition shown in FIG. 7. Again, when the motor is reactivated to drive the film gear 12 towards the loading direction to rotate a small distance, and the function of the free range angle A will stabilize the shaft 11 from being moved, and the film will not be extended.

To prevent the film compartment 101 from performing the automatic loading procedure by the camera motor when the compartment cover is closed but without any film, this invention calls for a central processor (not shown) so that the motor will not perform any movement when the film compartment 101 is empty.

Although the present invention has been illustrated and described with reference to the preferred embodiment thereof, it should be understood that it is in no way limited to the details of such embodiment but is capable of modifications within the scope of the appended claims.

What is claimed is:

1. A locking mechanism for a film compartment door of a camera having a film advancing and rewinding mechanism, the locking mechanism comprising:
    a) a first gear rotated by the film advancing and rewinding mechanism from a film loading position in a first direction when advancing film and in a second, opposite direction when rewinding film;
    b) a lever movable between a first position wherein the film compartment door is locked, and a second position wherein the film compartment door is unlocked, the lever having at least one stop thereon;
    c) a transmission gear engaging the first gear so as to be rotated by rotation of the first gear; and,
    d) an engaging block movable between a first position in which it engages the at least one stop on the lever to hold the lever in the first position, and a second position wherein it is disengaged from the at least one stop thereby permitting the lever to be moved to the second position, the engaging block being moved between the first and second positions by frictional contact with the transmission gear.

2. The film compartment door locking mechanism of claim 1 further comprising a spring washer bearing against the engaging block so as to urge the engaging block into frictional contact with the transmission gear.

3. The film compartment door locking mechanism of claim 1 further comprising:
    a) a hook plate movable between latched and unlatched positions; and,
    b) a pivoting transmission plate engaging the hook plate and the lever, movement of the transmission plate moving the hook plate between the latched and unlatched positions, whereby movement of the transmission plate is prohibited when the lever is in the first position.

4. The film compartment door locking mechanism of claim 3 further comprising a spring acting on the transmission plate such that the hook plate is biased toward the latched position.

5. The film compartment door locking mechanism of claim 1 wherein the lever has first and second stops thereon, and wherein the engaging block engages the first stop in the first position, the engaging block being movable to a third position wherein it engages the second stop.

6. The film compartment door locking mechanism of claim 1 further comprising a cover plate attached to the first gear so as to rotate therewith.

7. The film compartment door locking mechanism of claim 6 wherein the cover plate has a positioning plate thereon.

* * * * *